(12) United States Patent
Yamada et al.

(10) Patent No.: US 7,334,843 B2
(45) Date of Patent: Feb. 26, 2008

(54) SEAT RECLINING APPARATUS FOR VEHICLE

(75) Inventors: Yukifumi Yamada, Toyoto (JP); Yasuhiro Kojima, Kariya (JP)

(73) Assignee: Aisin Seiki Kabushiki Kaisha, Kariya-shi, Aichi-Ken (JP)

( * ) Notice: Subject to any disclaimer, the term of this patent is extended or adjusted under 35 U.S.C. 154(b) by 0 days.

(21) Appl. No.: 11/594,174

(22) Filed: Nov. 8, 2006

(65) Prior Publication Data

US 2007/0108825 A1    May 17, 2007

(30) Foreign Application Priority Data

Nov. 16, 2005   (JP) .............................. 2005-332198

(51) Int. Cl.
*B60N 2/02* (2006.01)
(52) U.S. Cl. ..................................................... 297/367
(58) Field of Classification Search ................ 297/367, 297/366
See application file for complete search history.

(56) References Cited

U.S. PATENT DOCUMENTS 5,685,611 A * 11/1997 Eguchi et al. .......... 297/367 X
6,328,382 B1 * 12/2001 Yamashita ................... 297/367
6,843,533 B1 * 1/2005 Miyata et al. .............. 297/367

FOREIGN PATENT DOCUMENTS

JP          2645583 B2     5/1997
JP          2002-101993 A  4/2002

* cited by examiner

*Primary Examiner*—Anthony D. Barfield
(74) *Attorney, Agent, or Firm*—Buchanan Ingersoll & Rooney PC (57) ABSTRACT

A seat reclining apparatus includes: a base plate fixed to a seat bottom or a seatback and including a plurality of guiding portions extending in a radial direction of the base plate; a gear plate fixed to the seat bottom or the seatback, the gear plate rotatably assembled at the base plate and formed with internal teeth; a lock gear assembled at the base plate and guided by the guiding portions of the base plate to be movable in the radial direction, the lock gear being formed with external teeth engageable with the internal teeth of the gear plate. At least one external tooth, which is positioned at a front end or a rear end from a rearward tilting direction of the seatback, has a radius of a pitch circle being smaller than a radius of a pitch circle of the internal teeth of the gear plate.

4 Claims, 8 Drawing Sheets

SEAT RECLINING APPARATUS FOR VEHICLE

CROSS REFERENCE TO RELATED APPLICATIONS

This application is based on and claims priority under 35 U.S.C. § 119 to Japanese Patent Application 2005-332198, filed on Nov. 16, 2005, the entire content of which is incorporated herein by reference.

FIELD OF THE INVENTION

The present invention relates to a seat reclining apparatus for a vehicle. More particularly, the present invention pertains to a seat reclining apparatus, which enables to adjust a tilting angle of a seatback relative to a seat bottom.

BACKGROUND

Conventionally, backrests (seatbacks) of front seats of vehicles are tilted at an adjustable angle relative to seat cushions, thereby supplying comfortableness to occupants seated on a passenger's and a driver's seat. Further, as for vehicles of a 3-door version, backrests (seatbacks) of front seats are tilted at an adjustable angle relative to seat cushions in a way that the front seats are folded forward and occupants easily get on and off a rear space of the vehicle. More specifically, according to a seat reclining apparatus disclosed in Japanese Patent No. 2645583 (see FIGS. 3-6), a base plate is attached to a seat cushion frame, while a turn plate is attached to a seatback frame. A ring-shaped internal gear is provided at an inner side of the turn plate. A lock gear is provided at an inner side of the base plate and includes teeth at an outer periphery of the lock gear, the teeth which are engageable with the internal gear of the turn plate. More particularly, the lock gear is biased by a torsion spring in a radial direction so that the teeth of the lock gear are engaged with the internal gear of the turn plate. When the engagement between the internal gear of the turn plate and the lock gear is released, a tilting angle of the seat cushion (seat bottom) relative to the seatback is adjusted.

In the above-described seat reclining apparatus, there have been cases in which an operator manually operates an operation lever while being seated and leaning on the backrest (seatback) of the seat. A lock release operation is then implemented so as to move the lock gear towards the center of the base plate via a cam in response to the manual operation of the operation lever by an operator. While the operator is being seated and is leaning on the backrest of the seat, the lock gear has been engaged with the internal gear of the turn plate, the internal gear which has been forced rearward by the operator leaning on the seatback. However, once the lock release operation is implemented while the lock gear is in engagement with the internal gear of the turn plate, the lock gear is suddenly disengaged from the internal gear of the turn plate. Further, an abnormal noise occurs at the time of the disengagement therebetween. The followings are one of the possible reasons of the occurrences of this abnormal noise. As illustrated in FIGS. 9-12, a lock gear 103 is formed with external teeth 109 at an outer periphery thereof. A gear plate 101 is formed with internal teeth 107 at an inner periphery thereof. In proportion to the load applied to the seatback, the gear plate 101 is applied with load so as to rotate in a rear direction. The lock gear 103, which is in engagement with the gear plate 101, is therefore pushed so as to rotate in the rear direction. The lock gear 103 is hence inclined or tilted rearward from a normal position by a clearance t between each guide wall 105 and the lock gear 103. As a result, the internal tooth 107 is not sufficiently engaged with the corresponding external tooth 109, which is positioned at a front-end portion of the whole sequence of the external teeth 109. Meanwhile, the other internal tooth 107 is firmly engaged with the corresponding external tooth 109, which is positioned at a rear-end portion of the whole sequence of the external teeth 109. Here, the front-end portion is a front side from the rearward tilting direction of the seatback, i.e., is a front side to which the seatback is tilted rearward, while the rear-end portion is a rear side from the rearward tilting direction of the seatback, i.e., is a rear side to which the seatback is tilted forward.

Therefore, when the internal teeth 107 are fully disengaged from the external teeth 109, a pushing force from the internal teeth 107 of the gear plate 101 is transmitted to and concentrated on a tooth top of the single external tooth 109, which is positioned at the rear-end portion of the whole sequence of the external teeth 109. Accordingly, a type of frictional sound may occur when the internal teeth 107 are released or disengaged with a large impact under such concentrated circumstances.

JP2002-101993A discloses a seat reclining mechanism, which prevents generation of an abnormal noise even when an occupant leans on a backrest (backseat). A front inclined face of a front locking tooth appearing in the forefront location of a lock plate (lock gear) is formed by adding a predetermined extracting angle to a pressure angle. The forefront location of the lock plate corresponds to a rear-end portion in a rotation direction of the backseat. Therefore, an impact, which may occur at an event that internal teeth of a second bracket are released from engagement teeth, is reduced, which prevents abnormal noise occurrences.

As disclosed in JP2002-101993A, a pressure angle is increased at a tooth top of the lock plate (lock gear) by being added with an extracting angle, which leads to reduction in a tooth thickness, and a tooth height of the engagement tooth of the lock plate (lock gear). This may cause lowering of engagement rigidity between the internal teeth of the bracket and the engagement teeth.

The present invention has been made in view of the above circumstances, and provides a seat reclining apparatus, in which occurrences of abnormal noises are prevented even if a lock releasing operation is performed in a state where an occupant is leaning on a backseat, and in which engagement rigidity between a lock gear and a gear plate is not lowered.

SUMMARY OF THE INVENTION

According to an aspect of the present invention, a seat reclining apparatus includes: a base plate fixedly attached to one of a seat bottom and a seatback and including a plurality of guiding portions extending in a radial direction of the base plate; a gear plate fixedly attached to the other one of the seat bottom and the seatback, the gear plate rotatably assembled at the base plate and formed with internal teeth; a lock gear assembled at the base plate and guided by the guiding portions of the base plate to be movable in the radial direction, the lock gear being formed with external teeth engageable with the internal teeth of the gear plate. The seat reclining apparatus further includes: a cam member rotatable and controlling a radial movement of the lock gear so that the lock gear is engaged with or disengaged from the internal teeth of the gear plate; and a biasing member for biasing the cam member to rotate in a direction for engaging the lock gear with the internal teeth. At least one external tooth, which is positioned at at least one of a front end and a rear end from a rearward tilting direction of the seatback, has a radius of a pitch circle being smaller than a radius of a pitch circle of the internal teeth of the gear plate.

Further, it is preferable that at least one external tooth, which is positioned at at least one of a front end and a rear end from a rearward tilting direction of the seatback, has a center of a pitch circle shifted from a center of a pitch circle of the internal teeth of the gear plate toward the internal teeth of the gear plate and toward the opposite side of each end of the gear plate.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
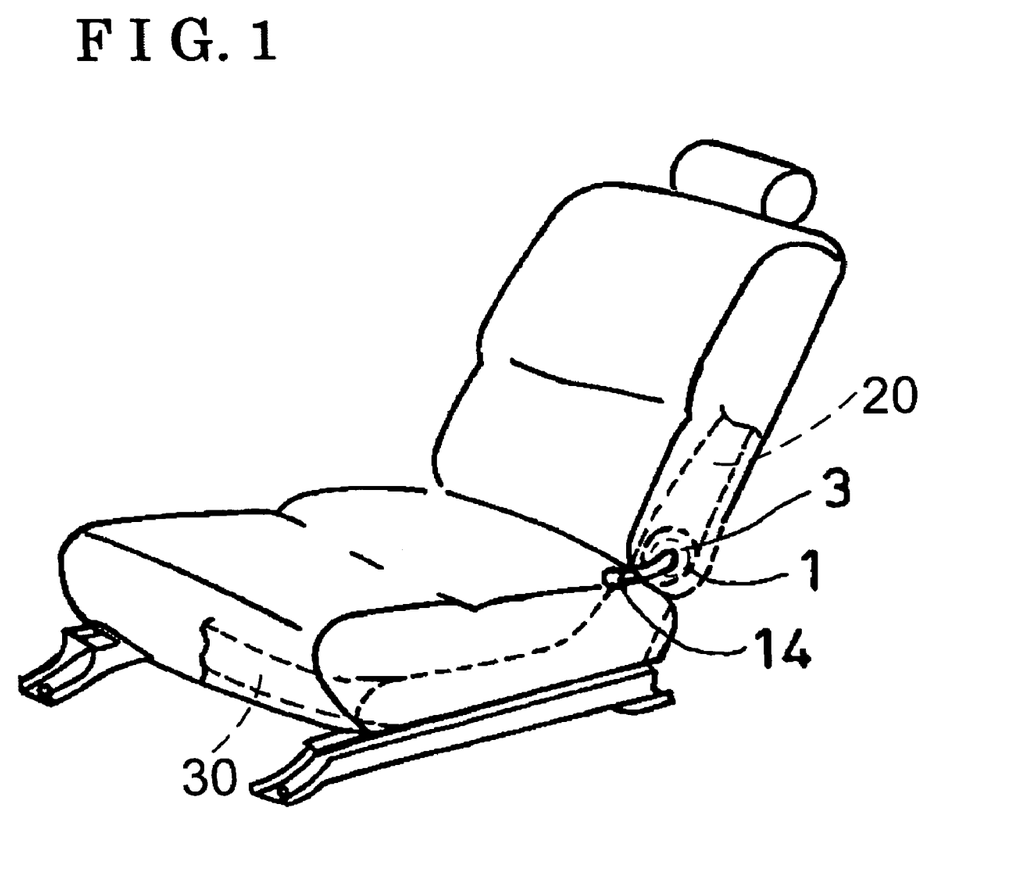
FIG. 1 is a view illustrating a seat reclining apparatus mounted on a seat according to an embodiment of the present invention.
Figure 2:
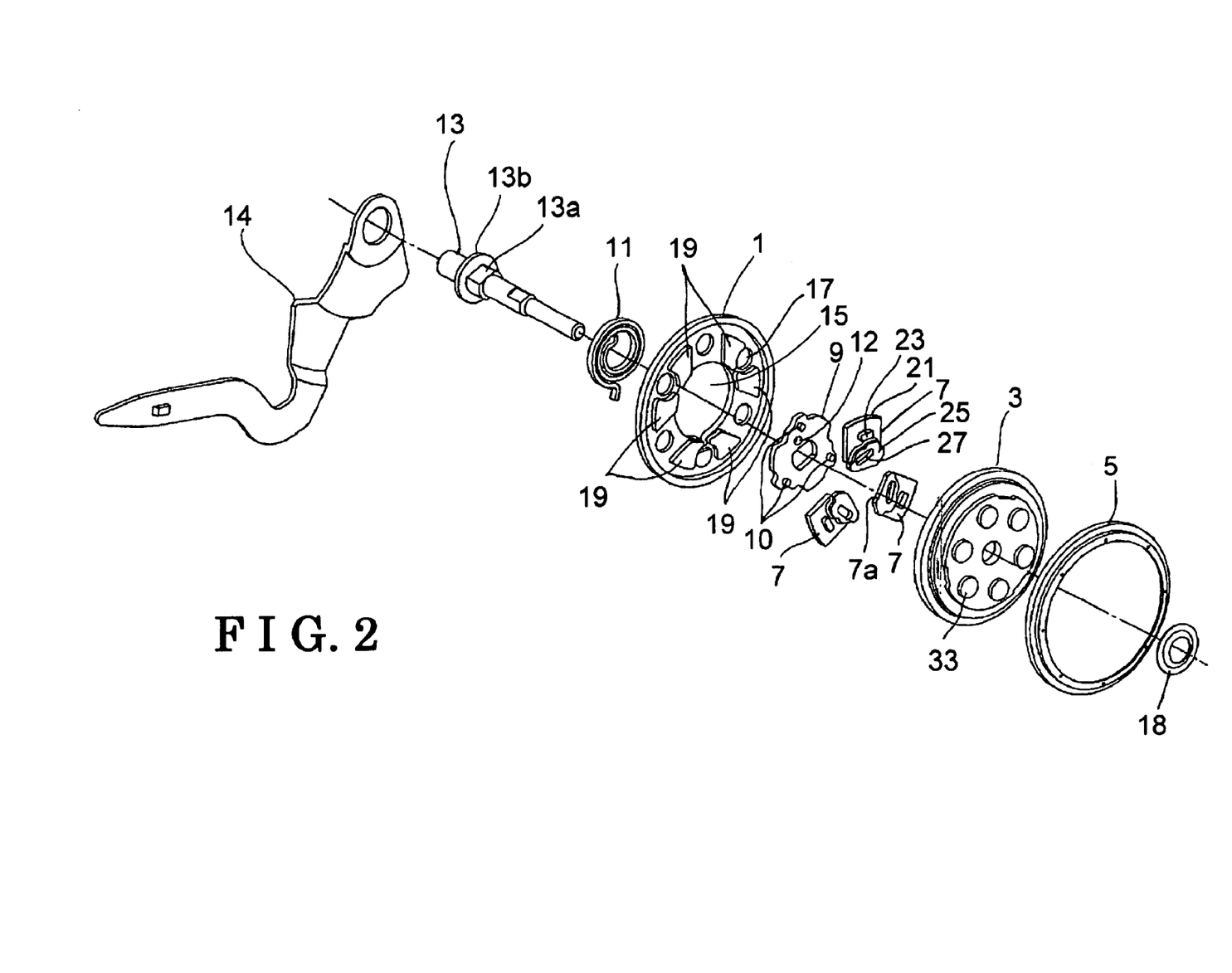
FIG. 2 is an exploded view illustrating an assembling structure of the seat reclining apparatus.
Figure 3:
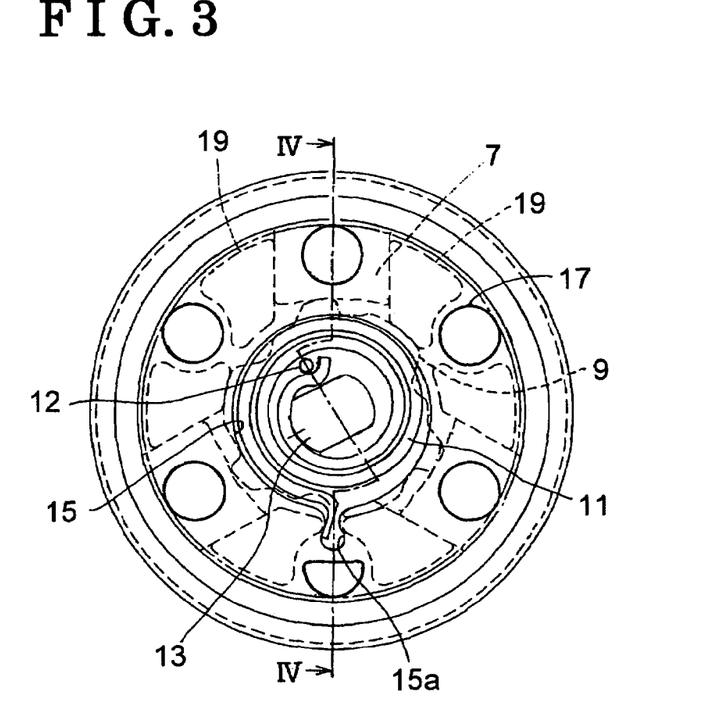
FIG. 3 is a front view of the seat reclining apparatus.

A seat reclining apparatus for a vehicle according to an embodiment of the present invention will be described with reference to the attached drawing figures. FIG. 1 is a view illustrating a seat reclining apparatus mounted on a seat. FIG. 2 is a view illustrating an assembling structure of the seat reclining apparatus. FIG. 3 is a front view of the seat reclining apparatus.

A base plate 1 is fixed to a seat cushion frame 30 via a bracket (not illustrated). The seat cushion frame 30 serves as a seat bottom. A gear plate 3 is fixed to a seatback frame 20 via a bracket (not illustrated). The gear plate 3 is operatively assembled to the base plate 1. The base plate 1 and the gear plate 3 are rotatably integrated by a support plate 5, which presses peripheries of the base plate 1 and the gear plate 3. A space is defined in an axial direction between the base plate 1 and the gear plate 3. Provided in this space are: three lock gears 7; a center cam 9 as a cam member; and a spiral spring 11 as a biasing member. An interlocked shaft 13 extends through the base plate 1 and the gear plate 3. The base plate 1 and the gear plate 3 are retained by a push nut 18 while being in contact with one end surface of a flange 13b of the interlocked shaft 13. A lever 14 is attached in contact with the other end surface of the flange 13b of the interlocked shaft 13 in a way that the interlocked shaft 13 is rotated integrally with the lever 14 in response to an operation of the lever 14.

The base plate 1 is formed with a through hole 15 at an approximately center thereof, and the spiral spring 11 is housed in the through hole 15. The through hole 15 is provided with an engagement groove 15a into which an outer end of the spiral spring 11 is hooked. The base plate 1 includes multiple round protrusions 17 which are formed by half die cutting. The round protrusions 17 protrude outwardly at an end surface of the base plate 1, at which the base plate 1 is attached to the seat cushion frame 30. According to the embodiment, the base plate 1 includes the six round protrusions 17. The base plate 1 is fixed to the seat cushion frame 30 not to rotate with the round protrusions 17 by which the base plate 1 is assembled to the seat cushion frame 30. The base plate 1 further includes multiple pairs of guiding portions 19 protruding inwardly at an end surface of the base plate 1 opposite to the other end surface assembled to the seat cushion frame 30. According to the embodiment, the base plate 1 includes the three pairs of guiding portions 19, each pair of which are arranged in a radial direction with 120 degrees interval to an adjacent pair. Each pair of guiding portions 19 is operatively assembled with the lock gear 7 in a way that the lock gear 7 is freely slidable in the radial direction. Each lock gear 7 is formed with external teeth 21 at an outer periphery thereof. Further, each lock gear 7 is provided with a protrusion 23 at a surface of the lock gear 7 facing the gear plate 3, which protrusion 23 is guided by a guiding edge of the gear plate 3. The guiding edge of the gear plate 3 will be described in detail later. Each lock gear 7 is further provided with a base 25 at a radial inner side thereof, which base 25 is arranged between the center cam 9 and the gear plate 3. The base 25 includes an elongated hole 27 slanting relative to a circumferential direction, which elongated hole 27 guides each corresponding cam projection of the center cam 9. The cam projection will be described in detail later. The center cam 9 is fixed to a sleeve 13a of the interlocked shaft 13 not to rotate relative to the interlocked shaft 13. A cam mechanism is configured with the center cam 9, of which outer periphery exhibits a non-flat shape (i.e., irregular shape), and each lock gear 7, of which sliding surface 7a corresponding to the external teeth 21 comes in contact with the outer periphery of the center cam 9. Cam projections 10 are provided at the center cam 9 and projects towards the seatback frame 20. According to the embodiment, there are the three cam projections 10 provided with 120 degrees interval to an adjacent one. Each cam projection 10 is slidably fitted into the elongated hole 27 of the corresponding base 25. The center cam 9 further includes an engagement projection 12 with which an inner end of the spiral spring 11 is engaged. Therefore, the center cam 9 is biased by the spiral spring 11 so as to rotate (counterclockwise in FIG. 3) in a direction for pushing the lock gears 7 radially outwardly.

As illustrated in FIGS. 5, 6, 7 and 8, the external teeth 21 of each lock gear 7 are designed with a radius of a pitch circle in a way that the external teeth 21 are engageable with the internal teeth 29 formed at an inner peripheral surface of the gear plate 3. A radius of the pitch circle of the external teeth 21 is formed to be smaller than a radius of a pitch circle of the internal teeth 29. In other words, a radius of the pitch circle of at least one external tooth 21 is smaller than a radius of the pitch circle of the internal teeth 29. The one external tooth 21 herein is located at a side of a rearward tilting direction of the seatback. The gear plate 3 includes multiple round protrusions 33 which are formed by half die cutting. The round protrusions 33 protrude inwardly at an end surface of the seatback frame 20. According to the embodiment, the gear plate 3 includes six round protrusions 33. The gear plate 3 is fixed to the seatback frame 20 not to rotate with the round protrusions 33 by which the gear plate 3 is assembled to the seatback frame 20.

Described below is an operation of the seat reclining apparatus 1 for a vehicle with the above-described structure with reference to the attached drawing figures. The spiral spring 11 biases the center cam 9 so as to rotate counter-clockwise in FIG. 3, which leads the lock gears 7 to move in a radially outward direction. As a result, the external teeth 21 of the lock gears 7 are engaged with the internal teeth 29 of the gear plate 3.

Figure 4:
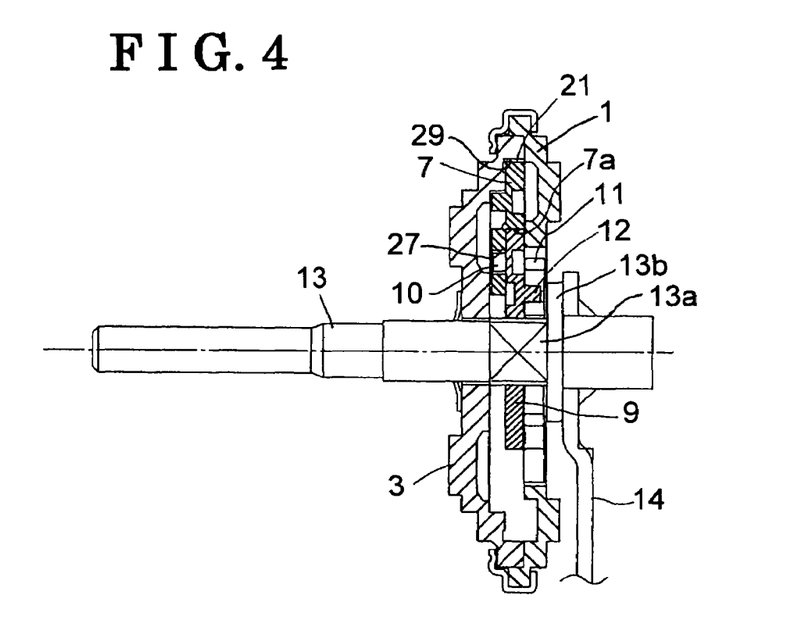
FIG. 4 is a sectional view taken along line IV-IV in FIG. 3.
Figure 5:
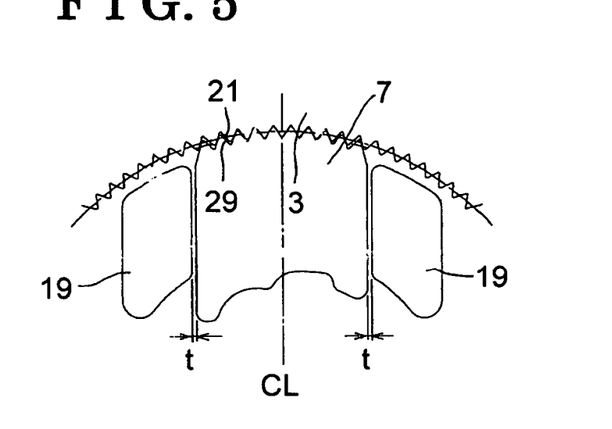
FIG. 5 is a view illustrating an engagement state between internal teeth and external teeth.

FIG. 4 illustrates an engagement relationship between the external teeth 21 of the lock gear 7 and the internal teeth 29 of the gear plate 3 in a state where any substantial load has not been applied to the seatback, e.g., when there is no occupants or objects on the seat bottom. In such cases, the lock gear 7 and the gear plate 3 are engaged with each other by four or five teeth 21 and 29 at a centerline CL.

Figure 6:
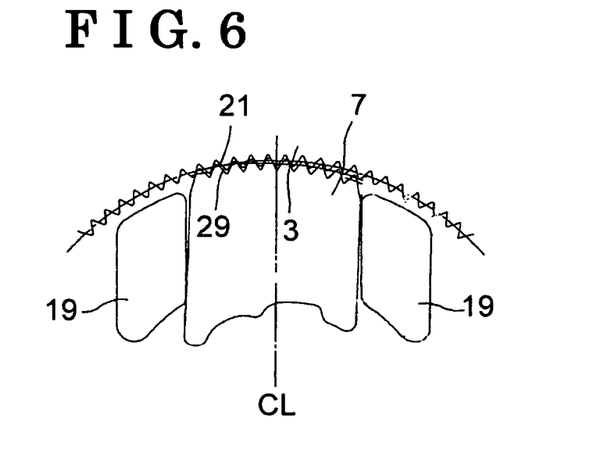
FIG. 6 is another view illustrating an engagement state between the internal teeth and the external teeth.
Figure 7:
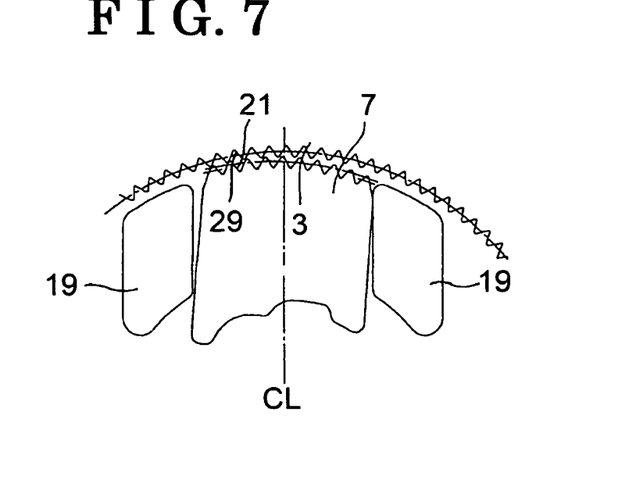
FIG. 7 is another view illustrating an engagement state between the internal teeth and the external teeth.
Figure 8:
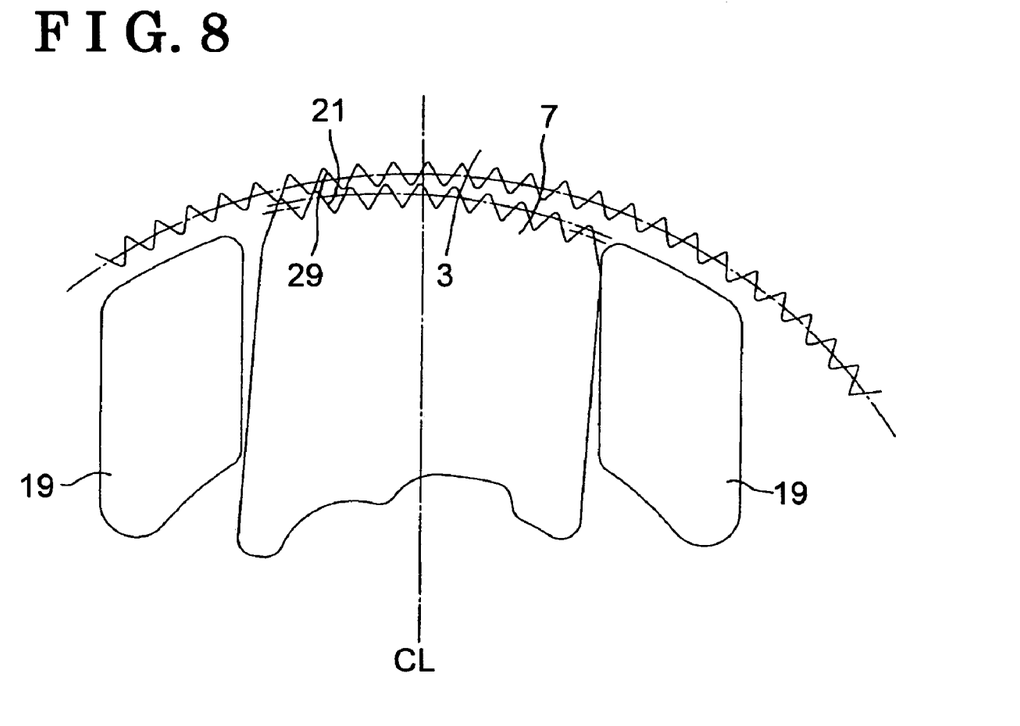
FIG. 8 is an enlarged view of FIG. 7.
Figure 9:
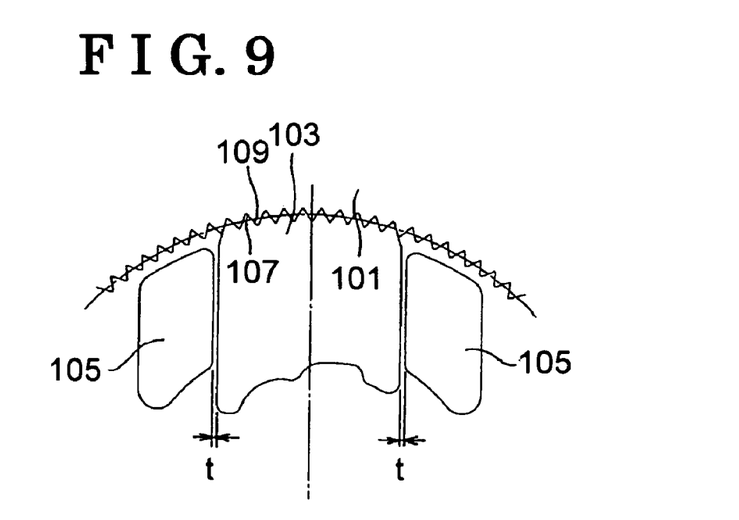
FIG. 9 is a view illustrating an engagement state between internal teeth and external teeth according to a prior art.
Figure 10:
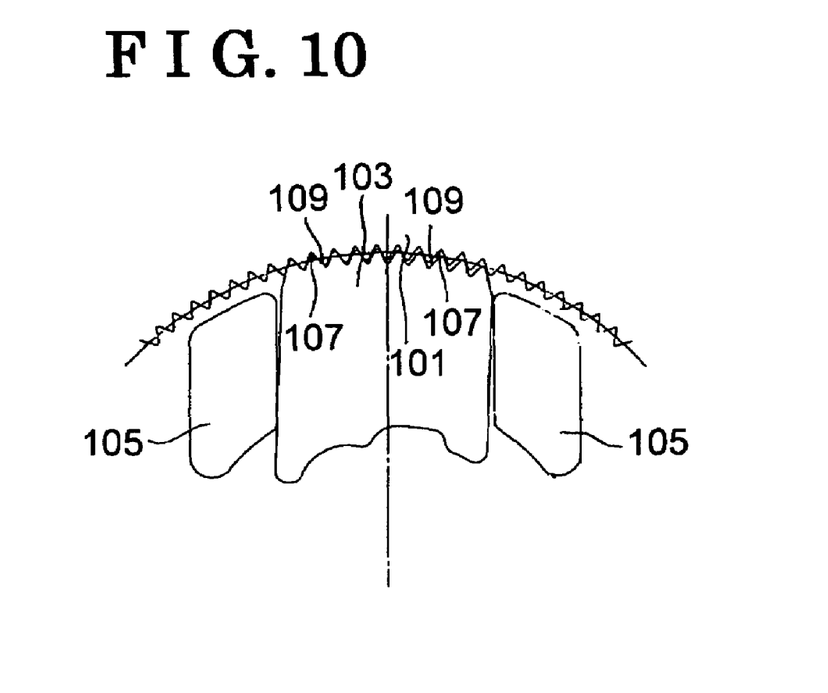
FIG. 10 is another view illustrating an engagement state between the internal teeth and the external teeth according to the prior art.
Figure 11:
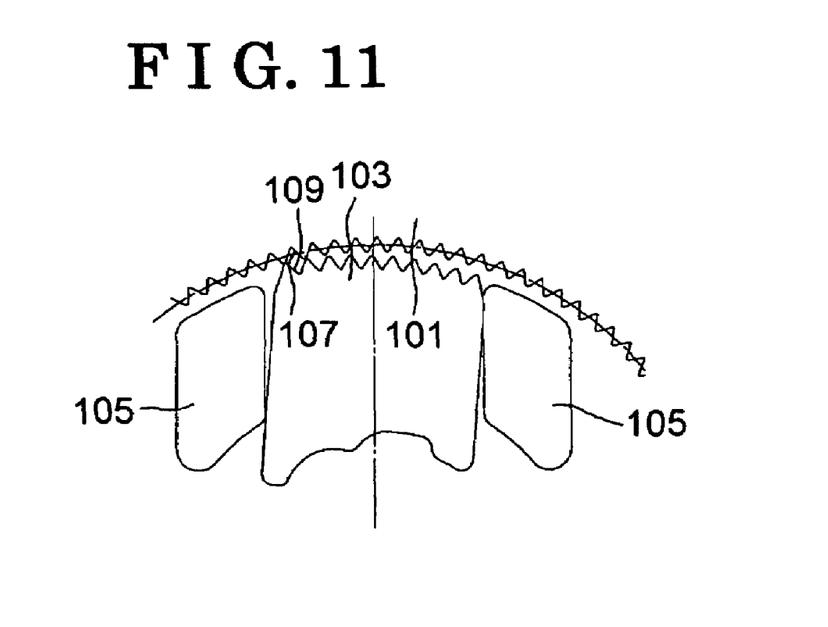
FIG. 11 is another view illustrating an engagement state between the internal teeth and the external teeth according to the prior art.
Figure 12:
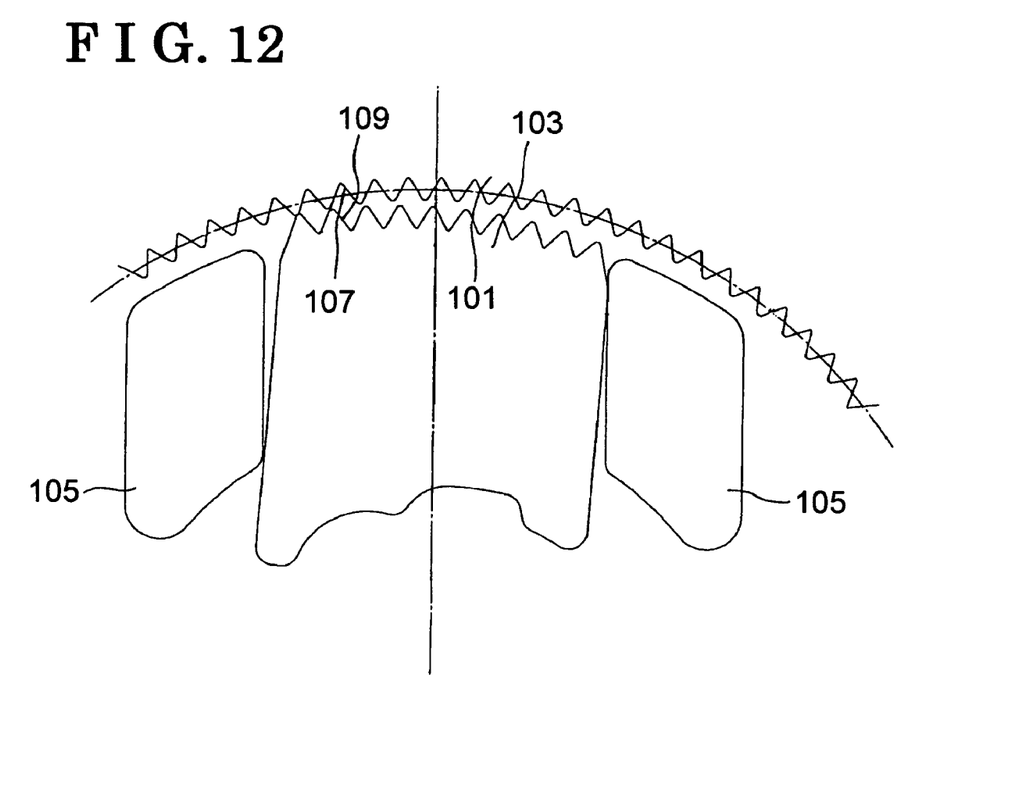
FIG. 12 is an enlarged view of FIG. 11.

When an occupant is seated on the seat cushion and leans on the seatback, load is applied to the seatback and the gear plate 3 rotates rearward. The lock gears 7, which are in engagement with the gear plate 3, are pressed so as to rotate rearward. Each lock gear 7 hence inclines by a clearance t defined between the corresponding guiding portion 19 and the lock gear 7. As described above, the radius of the pitch circle of the external teeth 21 of each lock gear 7 is smaller than the radius of the pitch circle of the internal teeth 29 of the gear plate 3. Therefore, as illustrated in FIG. 6, the internal teeth 29 of the gear plate 3 are engaged not only with one of the external teeth 21, which is located at the rear end portion of the sequence of the whole external teeth 21, but also with others (at least another one), which are located immediately in front of the one of the external teeth 21. Here, the rear end portion of the sequence of the whole external teeth 21 is positioned at a rear end from a rearward tilting direction of the seatback, i.e., is illustrated at the left side in FIG. 6. Likewise, the front of the one of the external teeth 21 is illustrated at the right side of the one of the external teeth 21 in FIG. 6. When the seatback is tilted rearward even farther, the interlocked shaft 13 is rotated clockwise in FIG. 2 in response to an operation of the lever 14, and the center cam 9 is rotated. In response to a sliding of the cam projections 10 in the elongated holes 27 of the lock gears 7, the lock gears 7 retract radially inwardly. In this case, according to the embodiment, the external teeth 21, which are positioned at an opposite side to the rear end portion of the sequence of the whole external teeth 21, i.e., at the frontward side, are disengaged from the internal teeth 29 of the gear plate 3 earlier than the external teeth 21, which are positioned at the rearward side. Here, the frontward side is illustrated at the right side in FIG. 7, while the rearward side is illustrated at the left side in FIG. 7. However, at a moment that the lock gears 7 are fully disengaged from the gear plate 3, plural external teeth 21, which are positioned at the rear end portion of each lock gear 7 and immediately in front of the rear end portion thereof, are disengaged from the corresponding internal teeth 29 of the gear plate 3 simultaneously. According to the embodiment, two external teeth 21 are disengaged simultaneously. Therefore, according to the embodiment, contact pressure of the internal teeth 29 does not focus locally on one external tooth 21 of each lock gear 7, which prevents the lock gear 7 from being released from the gear plate 3 with an impulse. Therefore, it is possible to prevent occurrences of abnormal noise. Further, as described above, the radius of the pitch circle of the external teeth 21 of each lock gear 7 is smaller than the radius of the pitch circle of the internal teeth 29 of the gear plate 3. However, this pitch circle structure does not cause reduction of a tooth length and/or a tooth thickness. Besides, the teeth 21 and 29 are not designed with a reduced tooth length and/or a reduced tooth thickness. Therefore, engagement strength between the lock gears 7 and the gear plate 3 is not lowered.

Figure 13:
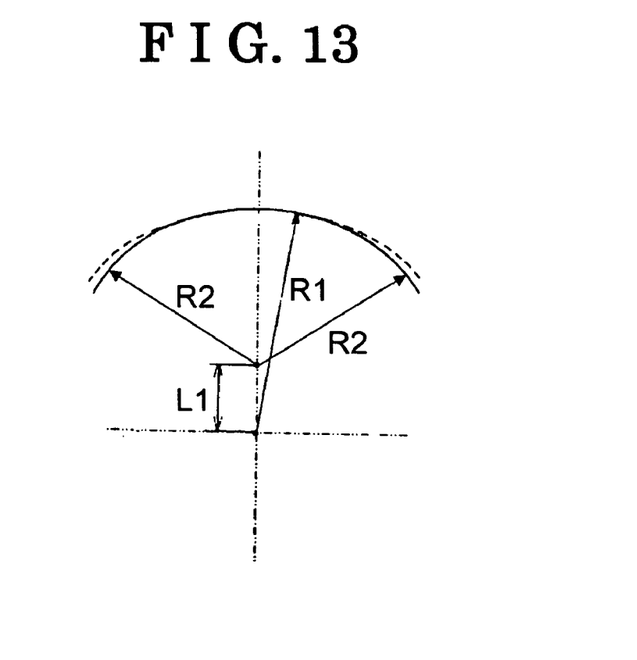
FIG. 13 is a view schematically illustrating a relationship between a pitch circle of internal teeth and a pitch circle of external teeth.

According to the embodiment, the radius of the pitch circle of all external teeth of each lock gear are smaller than the radius of the pitch circle of the internal teeth of the gear plate. Alternatively, as schematically illustrated in FIG. 13, at least one external tooth (can be plural teeth), each of which is located at the front-end portion (right side in FIG. 13) and at the rear-end portion (left side in FIG. 13) of the sequence of the whole external teeth in the rearward tilting direction of the seatback, has a radius of a pitch circle smaller than the radius of the pitch circle of the internal teeth of the gear plate. In FIG. 13, the radius R2 of the pitch circle of each external tooth at the front-end and the rear-end of each lock gear is smaller than the radius R1 of the pitch circle of the internal teeth of the gear plate. Further, the center of the pitch circle of each external tooth at each end of each lock gear is eccentrically positioned by L1 radially from the center of the pitch circle of the internal teeth of the gear plate.

Figure 14:
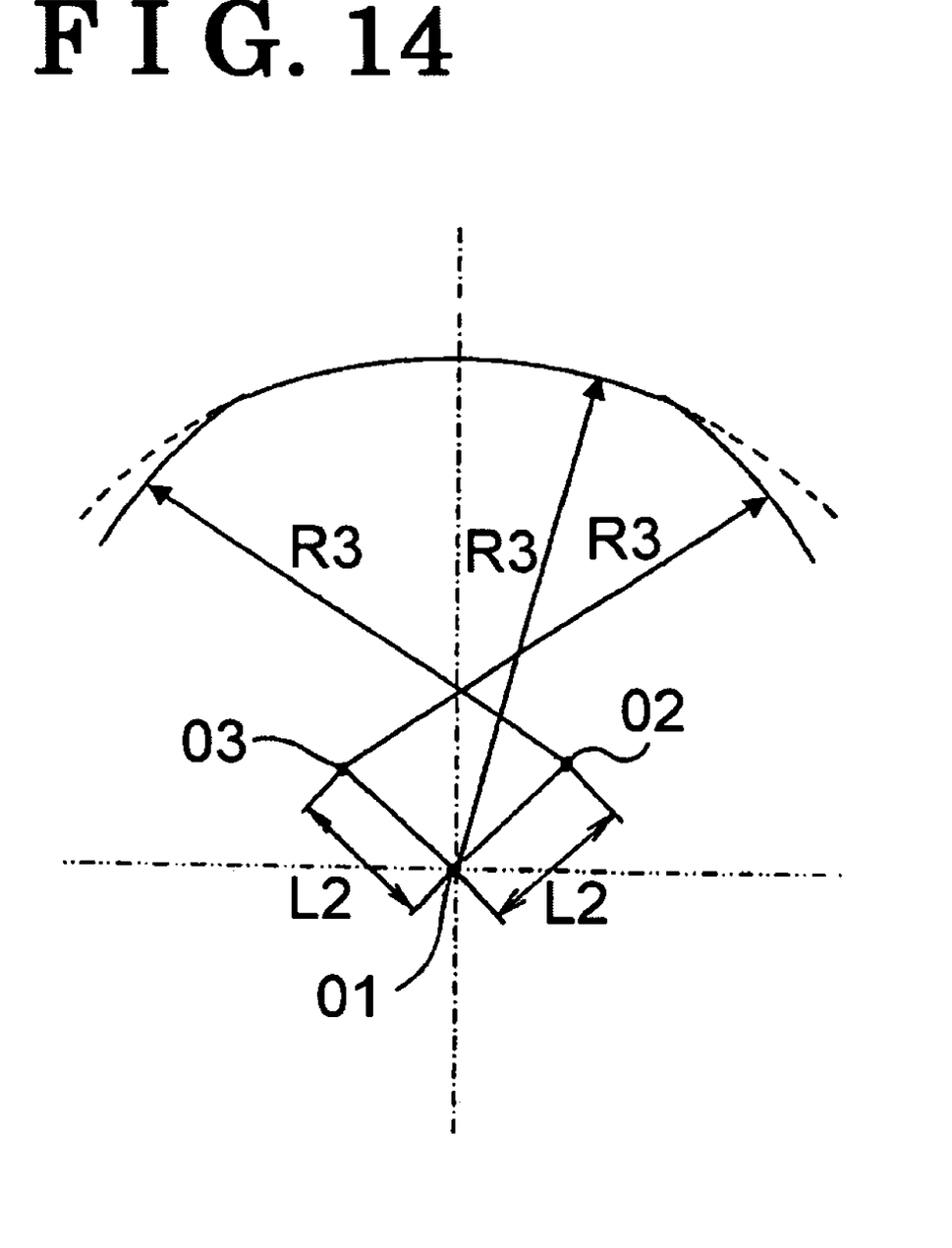
FIG. 14 is a view schematically illustrating a relationship between a pitch circle of internal teeth and a pitch circle of external teeth according to another embodiment.

Described below is another embodiment of the seat reclining apparatus for a vehicle. FIG. 14 is a view illustrating a pitch circle of internal teeth of a gear plate, of which center is 01, and pitch circles of external teeth, which are positioned at ends of the sequence of the whole external teeth of a lock gear and of which centers are 02 and 03. Each pitch circle has a radius R3 which has the same length. The center 02 is shifted by the amount L2 from the center 01 towards the internal teeth and towards the opposite end of sequence of the whole external teeth for the radius R3. The center 03 is shifted by the amount L2 from the center 01 towards the internal teeth and towards the opposite end of the gear plate for the radius R3 of the center 02. As described above, according to this structure, the external teeth positioned at the end/ends of the lock gear move radially inwardly or outwardly greater than the other external teeth of the lock gear. Therefore, even when the gear plate inclines due to the leaning against the seatback, the internal teeth of the gear plate can be engaged not only with the external teeth at the end/ends of the lock gear but also with other external teeth of the lock gear. This structure can yield the same effects as described above.

As described above, when an occupant is leaning on a seatback, a lock gear is inclined by a clearance between a guiding portion and a lock gear. Here, an external tooth, which is positioned at at least one of front end and rear end from a rearward rotating direction of the seatback, has a radius of a pitch circle smaller than a radius of a pitch circle of internal teeth of a gear plate. Therefore, even when the lock gear has inclined, the internal teeth of the gear plate are engageable not only with the external tooth positioned at the at least one of the front end and the rear end but also with several external teeth positioned at the rear side or the front side of the external tooth. Therefore, when the lock gear is retracted in response to rotation of the cam member to incline the seatback rearward even farther, it is possible to release or disengage the external teeth at the one end from the internal teeth simultaneously at a moment of releasing all engagements. Accordingly, the engagement is not released with an impulse in a state where a contact pressure of the internal teeth has locally focused on a tooth top of a single external tooth, which prevents abnormal noise occurrences. Further, the external teeth of the lock gear are not designed with a reduced tooth length and/or a reduced tooth thickness. Therefore, engagement strength between the lock gear and the gear plate is not lowered.

Further, even when the lock gear is retracted in response to rotation of a cam member not only in a state where an occupant has leaned on a seatback but also in a state where the seatback has pushed to incline forward, occurrences of abnormal noises are prevented in the same manner as described above.

As described above, a radius of a pitch circle of the external teeth of the lock gear is smaller than a radius of a pitch circle of the internal teeth of the gear plate. Therefore, even when the lock gear is inclined, abnormal noise occurrences is prevented and engagement rigidity is not lowered, in the same manner as described above. Further, lock gears are manufactured continuously to have a pitch circle with an identical small radius. Therefore, the lock gears are manufactured economically and readily.

As described above, at least one external tooth, which is positioned at at least one of a front end and a rear end from a rearward tilting direction of the seatback, has a center of a pitch circle shifted from a center of a pitch circle of the internal teeth of the gear plate toward the internal teeth of the gear plate and toward the opposite side of each end of the gear plate. In this case, the external teeth positioned at the end/ends of the sequence of the whole external teeth of the lock gear move radially inwardly or outwardly greater than the other external teeth of the lock gear. Therefore, even when the gear plate inclines due to the leaning against the seatback, the internal teeth of the gear plate can be engaged not only with the external teeth at the end/ends of the lock gear but also with other external teeth of the lock gear. Therefore, when the lock gear is retracted in response to rotation of the cam member so as to further incline the seatback, it is possible to release or disengage the external teeth at one end from the internal teeth simultaneously at a moment of releasing all engagements. Accordingly, abnormal noise occurrences are prevented.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat reclining apparatus comprising:
    a base plate fixedly attached to one of a seat bottom and a seatback and
    including a plurality of guiding portions extending in a radial direction of the base plate;
    a gear plate fixedly attached to the other one of the seat bottom and the seatback, the gear plate rotatably assembled at the base plate and formed with internal teeth;
    a lock gear assembled at the base plate and guided by the guiding portions of the base plate to be movable in the radial direction, the lock gear being formed with external teeth engageable with the internal teeth of the gear plate, at least one external tooth, which is positioned at at least one of a front end and a rear end from a rearward tilting direction of the seatback, having a radius of a pitch circle being smaller than a radius of a pitch circle of the internal teeth of the gear plate;
    a cam member rotatable and controlling a radial movement of the lock gear so that the lock gear is engaged with or disengaged from the internal teeth of the gear plate; and
    a biasing member for biasing the cam member to rotate in a direction for engaging the lock gear with the internal teeth.

2. A seat reclining apparatus according to claim 1, wherein the external tooth, which has a radius of a pitch circle being smaller than the radius of the pitch circle of the internal teeth of the gear plate, is formed at each of the front end and the rear end of the lock gear.

3. A seat reclining apparatus for a vehicle according to claim 1, wherein a radius of a pitch circle of all the external teeth of the lock gear is smaller than the radius of the pitch circle of the internal teeth of the gear plate.

4. A seat reclining apparatus comprising:
    a base plate fixedly attached to one of a seat bottom and a seatback and
    including a plurality of guiding portions extending in a radial direction of the base plate;
    a gear plate fixedly attached to the other one of the seat bottom and the
    seatback, the gear plate rotatably assembled at the base plate and formed with internal teeth;
    a lock gear assembled at the base plate and guided by the guiding portions of the base plate to be movable in the radial direction, the lock gear being formed with external teeth engageable with the internal teeth of the gear plate, at least one external tooth, which is positioned at at least one of a front end and a rear end from a rearward tilting direction of the seatback, having a center of a pitch circle shifted from a center of a pitch circle of the internal teeth of the gear plate toward the internal teeth of the gear plate and toward the opposite side of each end of the gear plate;
    a cam member rotatable and controlling a radial movement of the lock gear so that the look gear is engaged with or disengaged from the internal teeth of the gear plate; and
    a biasing member for biasing the cam member to rotate in a direction for engaging the lock gear with the internal teeth.

* * * * *